US012795720B2

(12) United States Patent
Dong

(10) Patent No.: US 12,795,720 B2
(45) Date of Patent: Nov. 10, 2026

(54) METHOD AND APPARATUS FOR MULTI-LINK COMMUNICATION

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 246 days.

(21) Appl. No.: 18/554,604

(22) PCT Filed: Apr. 9, 2021

(86) PCT No.: PCT/CN2021/086270
§ 371 (c)(1),
(2) Date: Oct. 9, 2023

(87) PCT Pub. No.: WO2022/213391
PCT Pub. Date: Oct. 13, 2022

(65) Prior Publication Data

US 2024/0205965 A1 Jun. 20, 2024

(51) Int. Cl.
*H04W 74/00* (2009.01)

(52) U.S. Cl.
CPC ....... *H04W 74/006* (2013.01); *H04W 74/004* (2013.01)

(58) Field of Classification Search
CPC ............. H04W 74/002; H04W 74/004; H04W 74/006; H04W 74/02; H04W 74/04
See application file for complete search history.

(56) References Cited

U.S. PATENT DOCUMENTS

2021/0076412 A1 3/2021 Naribole et al.
2023/0074050 A1* 3/2023 Wu ......................... H04W 8/22
2023/0103325 A1* 4/2023 Li ..................... H04W 28/0875
(Continued)

FOREIGN PATENT DOCUMENTS

CN 111066271 A 4/2020
CN 112218363 A 1/2021
(Continued)

OTHER PUBLICATIONS

ISA State Intellectual Property Office of the People's Republic of China, International Search Report Issued in Application No. PCT/CN2021/086270, Jan. 6, 2022, WIPO, 4 pages.
Ericsson "On multi-subframe scheduling for uplink transmissions""3GPP TSG RAN WG1 Meeting #86 R1-167052 Gothenburg, Aug. 22-26, 2016" Aug. 26, 2016, 3 pages.
(Continued)

*Primary Examiner* — Pao Sinkantarakorn
(74) *Attorney, Agent, or Firm* — Volpe Koenig

(57) ABSTRACT

A method for multi-link communication includes: determining a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and transmitting the first message frame.

7 Claims, 3 Drawing Sheets

(56) References Cited

U.S. PATENT DOCUMENTS

| | | | | |
|---|---|---|---|---|
| 2023/0327717 | A1* | 10/2023 | Minotani | H04B 7/0452 |
| 2023/0354098 | A1* | 11/2023 | Ko | H04W 74/006 |
| 2024/0040428 | A1* | 2/2024 | Kim | H04L 45/24 |
| 2024/0172284 | A1* | 5/2024 | Tanaka | H04W 8/22 |

FOREIGN PATENT DOCUMENTS

| | | | |
|---|---|---|---|
| CN | 112492682 | A | 3/2021 |
| CN | 112566207 | A | 3/2021 |
| CN | 112566274 | A | 3/2021 |
| KR | 20210007881 | A | 1/2021 |
| WO | 2020055016 | A1 | 3/2020 |
| WO | 2021/045563 | A1 | 3/2021 |

OTHER PUBLICATIONS

European Patent Office, Extended European Search Report Issued in Application No. 21935615.1, Dec. 17, 2024, Germany, 8 pages.

ISA State Intellectual Property Office of the People's Republic of China, Written Opinion of the International Searching Authority Issued in Application No. PCT/CN2021/086270, Jan. 6, 2022, WIPO, 6 pages.

State Intellectual Property Office of the People's Republic of China, Office Action and Search Report Issued in Application No. 202180000963X, Mar. 21, 2025, 16 pages.

Broadcom Limited, "Discussion on LAA UL LBT Design", R1-162851, 3GPP TSG-RAN WG1 Meeting #84-BIS Busan, Apr. 11-15, 2016, 10 pages.

* cited by examiner

METHOD AND APPARATUS FOR MULTI-LINK COMMUNICATION

CROSS REFERENCE TO RELATED APPLICATIONS

This application is a National Phase of International Application No. PCT/CN2021/086270, filed on Apr. 9, 2021, the entire contents of which are incorporated herein by reference in their entireties.

TECHNICAL FIELD

The present disclosure relates to the field of wireless communication technologies, and in particular to methods for multi-link communication and apparatuses for multi-link communication.

BACKGROUND

The current research scope of Wi Fi technology is: 320 MHz bandwidth transmission, aggregation and collaboration of multiple frequency bands, etc. It is expected to improve the rate and throughput by at least four times compared to existing standards. Its main application scenarios are video transmission, augmented reality (AR), virtual reality (VR), etc.

Aggregation and collaboration of multiple frequency bands refers to communication between devices simultaneously in frequency bands such as 2.4 GHz, 5 GHZ, and 6 GHz. For communication between devices simultaneously in multiple frequency bands, a new media access control (MAC) mechanism needs to be defined for management. In addition, it is expected that the aggregation and collaboration of multiple frequency bands can support low-latency transmission.

Currently, the maximum bandwidth supported in multi-band aggregation and system technology is 320 MHz (160 MHz+160 MHz), and it may also support 240 MHz (160 MHz+80 MHz) and other bandwidths.

In the present technology, a station (STA) and an access point (AP) may be a multi-link device (MLD), which supports the ability to send and/or receive simultaneously in multiple links at the same time. Therefore, in current technology, there can be multiple links between the STA and the AP, and the communication between these two devices in multiple links is researched.

SUMMARY

Aspects of the present disclosure will address at least the above problems and/or disadvantages. Embodiments of the present disclosure provide the following technical solutions.

According to an embodiment of the present disclosure, there is provided a method for multi-link communication, performed by an access point supporting multi-link communication, and including: determining a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and transmitting the first message frame.

According to an embodiment of the present disclosure, there is provided a method for multi-link communication, performed by an access point supporting multi-link communication, and including: receiving a first message frame from a device supporting multi-link communication, where the first message frame includes first information, which is configured to indicate communication mode information for link pairs in multiple links supported by another access point corresponding to the device in each transmission opportunity (TXOP), and the communication mode information for the link pairs includes at least one of: communication mode relevant information for a first link pair set that is allowed to perform both uplink transmission and downlink transmission simultaneously, or communication mode relevant information for a second link pair set that is not allowed to perform both uplink transmission and downlink transmission simultaneously; and performing a communication operation based on the first message frame.

According to an embodiment of the present disclosure, there is provided a method for multi-link communication, performed by a station supporting multi-link communication, and including: receiving a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and performing a communication operation based on the first message frame.

According to an embodiment of the present disclosure, there is provided an apparatus for multi-link communication, applied to an access point supporting multi-link communication, and including: a processing module, configured to determine a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and a transmit-receive module, configured to transmit the first message frame.

According to an embodiment of the present disclosure, there is provided an apparatus for multi-link communication, applied to an access point supporting multi-link communication, and including: a transmit-receive module, configured to receive a first message frame from a device supporting multi-link communication, where the first message frame includes first information, which is configured to indicate communication mode information for link pairs in multiple links supported by another access point corresponding to the device in each transmission opportunity (TXOP), and the communication mode information for the link pairs includes at least one of: communication mode relevant information for a first link pair set that is allowed to perform both uplink transmission and downlink transmission simultaneously, or communication mode relevant information for a second link pair set that is not allowed to perform both uplink transmission and downlink transmission simultaneously; and a processing module, configured to perform a communication operation based on the first message frame.

According to an embodiment of the present disclosure, there is provided an apparatus for multi-link communication, applied to a station supporting multi-link communication, and including: a transmit-receive module, configured to receive a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and a processing module, configured to control the transmit-receive module to perform a communication operation based on the first message frame.

According to an embodiment of the present disclosure, there is provided an electronic device, including: a processor; and a memory storing computer programs executable by the processor, where the processor is configured to, when executing the computer programs, perform the above-mentioned method.

According to an embodiment of the present disclosure, there is provided a computer-readable storage medium, storing computer programs thereon, where the computer programs, when executed by a processor, cause the processor to perform the above-mentioned method.

THE DRAWINGS

By referring to the accompanying drawings and describing in detail the exemplary embodiments disclosed herein, the above and other features of the embodiments of the present disclosure will become more obvious.

DETAILED DESCRIPTION OF THE EMBODIMENTS

The following description with reference to the accompanying drawings is provided to aid in a full understanding of various embodiments of the present disclosure as defined by the appended claims and their equivalents. The various embodiments of the present disclosure include various specific details, but these specific details are considered exemplary only. In addition, for clarity and conciseness, descriptions of well-known technologies, functions, and constructions can be omitted.

Terms and phrases used in the present disclosure are not limited to their written meaning, but are used only by the inventors to enable a clear and consistent understanding of the disclosure. Accordingly, for those skilled in the art, the description of various embodiments of the present disclosure is provided for purposes of illustration only and not for purposes of limitation.

It will be understood that the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

It will be understood that while the terms "first", "second", etc., may be used herein to describe various elements, these elements should not be limited by these terms. These terms are only used to distinguish one element from another. Thus, without departing from the teachings of the example embodiments, the first element discussed below may be referred to as a second element.

It will be understood that when an element is referred to as "connected" or "coupled" to another element, it may be directly connected or coupled to another element, or there may be intermediate elements. In addition, "connected" or "coupled" as used herein may include wireless connection or wireless coupling. The terms "and/or" or the expression "at least one of . . . " as used herein include any and all combinations of one or more of the items listed therein.

Unless otherwise defined, all terms used herein, including technical or scientific terms, have the same meanings as those generally understood by those with ordinary knowledge in the field of art to which the present disclosure belongs.

Figure 1:
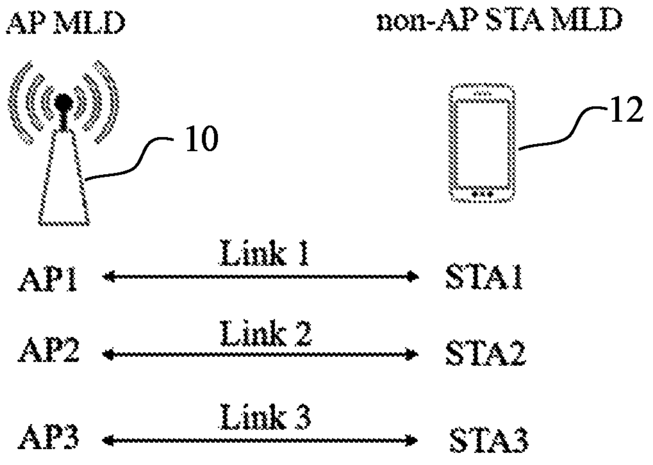
FIG. 1 is an exemplary diagram illustrating a multi-link communication scenario.

FIG. 1 is an exemplary diagram illustrating a multi-link communication scenario.

In a wireless local area network (LAN), a basic service set (BSS) may include an access point 10 (AP) and one or more stations 12 (STAs) in communication with the AP. A BSS can be connected to a distribution system (DS) through its APs and then to another BSS to form an extended service set (ESS).

An AP is a wireless switch used in a wireless network and is also a core of the wireless network. The AP device can be used as a wireless base station, mainly as a bridge to connect wireless and wired networks. By the AP, the wired and wireless networks can be integrated.

The AP may include software applications and/or circuitry to allow other types of nodes in the wireless network to communicate with the outside of the wireless network, as well as the inside of the wireless network via the AP. In some examples, for example, an AP can be a terminal device or a network device equipped with a wireless fidelity (Wi-Fi) chip.

As an example, a station may include, but is not limited to: a cellular phone, a smart phone, a wearable device, a computer, a personal digital assistant (PDA), a personal communication system (PCS) device, a personal information manager (PIM), a personal navigation device (PND), a global positioning system (GPS), a multimedia device, an internet of thing (IoT) device, and the like.

In the embodiments of the present disclosure, the AP and the STA may support a multi-link device (MLD), for example, and may be denoted as an access point multi-link device (AP MLD) and a non-access point station multi-link device (non-AP STA MLD), respectively. For the convenience of description, in the following, an example of multi-link communication between an AP and a STA will be mainly described. However, embodiments of the present disclosure are not limited thereto.

In FIG. 1, as an example only, the AP MLD can represent an access point that supports a multi-link communication function, and the non-AP STA MLD can represent a station that supports a multi-link communication function. Referring to FIG. 1, the AP MLD can include affiliated APs working in three links, such as an AP1, an AP2, and an AP3 shown in FIG. 1. The non-AP STA MLD can also include affiliated STAs working in three links, such as a STA1, a STA2, and a STA3 shown in FIG. 1. In the example in FIG. 1, for example, the AP1 communicates with the STA1 through a corresponding first link (link 1). Similarly, the AP2 and the AP3 communicate with the STA2 and the STA3 through a second link (link 2) and a third link (link 3), respectively. In addition, the link 1 to the link 3 can be multiple links at different frequencies, such as links at 2.4 GHz, 5 GHz, 6 GHZ, or several links with the same or different bandwidths at 2.4 GHz, 5 GHZ, 6 GHz. In addition, there can be multiple channels in each link. However, it will be understood that the communication scenario shown in FIG. 1 is only exemplary, and the present disclosure is not limited to thereto. For example, the AP MLD can be linked to multiple non-AP STA MLDs, or in each link, an AP can communicate with multiple other types of STAs.

Figure 2:
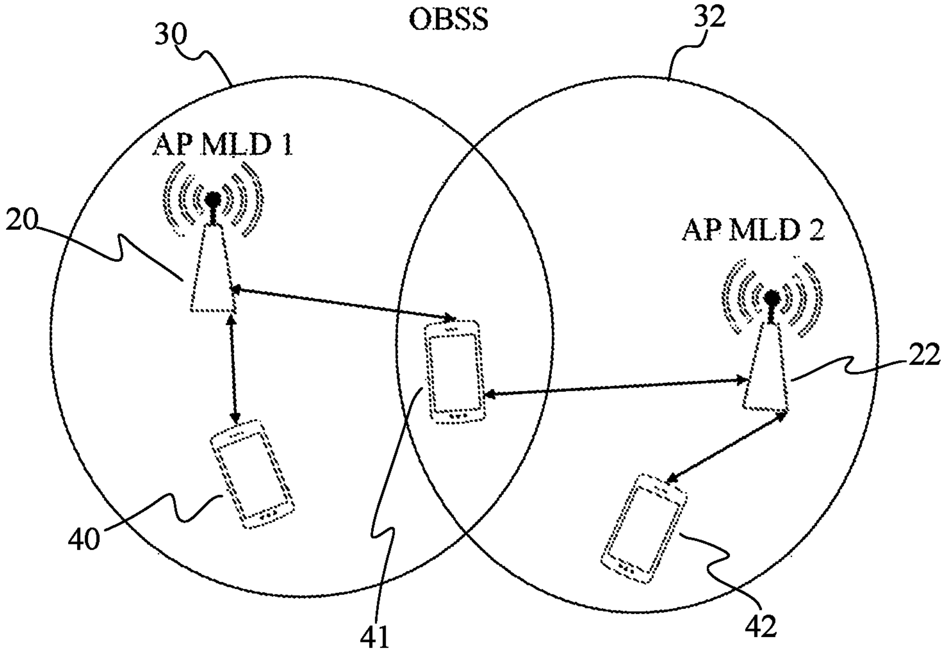
FIG. 2 is an exemplary diagram illustrating an overlapping basic service set (OBSS).

In some embodiments, an area of a BSS may be overlapped with an area of another BSS; they may be referred to as an overlapping basic service set (OBSS), as shown in FIG. 2, which is an exemplary diagram illustrating an OBSS.

In FIG. 2, as a descriptive embodiment, the BSS 30 in which an AP MLD 1 20 is located may be overlapped with the BSS 32 in which an AP MLD 2 22 is located, both the AP MLD 1 and the AP MLD 2 may communicate with two non-AP STA MLDs, and in the overlapping area, the AP MLD 1 and the AP MLD 2 may communicate with the same non-AP STA MLD.

Although not specifically shown in FIG. 2, both the AP MLD 1 and the AP MLD 2 in FIG. 2 may communicate with corresponding non-AP STA MLDs in multiple links, as shown in FIG. 1. In other words, multiple APs coexist in the OBSS communication environment shown in FIG. 2. In addition, affiliated APs of the AP MLD 1 and affiliated APs of the AP MLD 2 may communicate with the affiliated STAs 40, 41, 42 through the same or different links. It will also be appreciated that the OBSS shown in FIG. 2 is only exemplary, and the number of AP MLDs and non-AP STA MLDs and the mode of communication between them may be variously changed.

In the current state of the art research, devices can communicate in multiple links, and in order to increase the throughput even more, a simultaneous transmit and receive (STR) link pair, as well as a non-simultaneous transmit and receive (Non-STR) link pair, are introduced. The STR link pair is a link pair in which the uplink and downlink transmission is not interfered with at least two links communicating at any time, i.e., the at least two links can simultaneously perform the uplink and downlink transmission without interference. The non-STR pair is a link pair in which at least two links cannot simultaneously perform the uplink transmission and the downlink transmission when communicating at any time. Furthermore, in order to improve the regional throughput even further (multi-AP coexistence), coordination of multiple APs in multiple links is required. However, in the related art, the spatial reuse (SR) mode for enhancing the throughput of OBSS/multi-BSS is only applicable to a single link. To this end, the technical concepts of the present disclosure provide communication methods and communication devices that enable the STR and Non-STR information to be used in multi-AP coordination in multiple links to improve system throughput.

Figure 3:
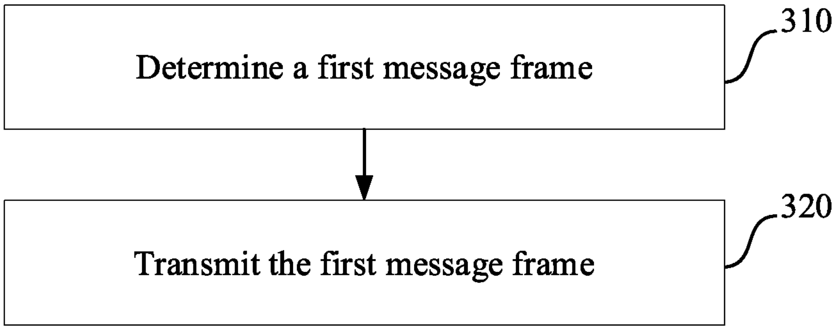
FIG. 3 is a flowchart illustrating a method for multi-link communication according to an embodiment of the present disclosure.

FIG. 3 is a flowchart illustrating a method for multi-link communication according to an embodiment of the present disclosure. The communication method shown in FIG. 3 may be applied in an OBSS communication environment, as shown in FIG. 2. In addition, the communication method shown in FIG. 3 can be applied to an access point supporting multi-link communication (e.g., an AP MLD) as a transmitter.

Referring to FIG. 3, at step 310, a first message frame may be determined. According to the embodiment, the first message frame may include first information, where the first information may be configured to indicate communication mode information for link pairs in multiple links in each transmission opportunity (TXOP). According to the embodiment, the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously.

In the embodiments of the present disclosure, there may be various ways of determining the first message frame, e.g., the first message frame may be generated based on at least one of the following: a network condition, a load condition, a hardware capability of the transmitting/receiving device, a service type, or a relevant protocol stipulation, the embodiments of the present disclosure are not limited thereto. In the embodiments of the present disclosure, the first message frame may also be obtained from an external device, and the embodiments of the present disclosure are not limited thereto.

For example, the first message frame may be an action frame or a beacon frame; however, the present disclosure is not limited thereto, and any other form of frame is feasible. Furthermore, the first information may be carried in the first message frame in the form of an information element (e.g., a multi-link (ML) information element).

According to the embodiments, the first information (ML information element) may have a format as shown in Table 1 below to carry information about the communication mode of the link pair used by the AP MLD.

TABLE 1

| format of the first information (ML information element) | | | | | | |
|---|---|---|---|---|---|---|
| Link pair set 1 | STR/Non-STR indication 1 | TXOP 1 | Link pair set 2 | STR/Non-STR indication 2 | TXOP 2 | . . . |

It will be understood that the format shown in Table 1 is only exemplary and not a limitation of the present disclosure; for example, the first information (ML information element) shown in Table 1 may also include an element identification (ID), a length, etc., and furthermore, portions shown in Table 1 may be omitted.

Referring to Table 1, the first information may include: an identifier of a link pair set, a communication mode indication (STR/Non-STR indication) identifier, a TXOP, and the like. The link pair set may identify which links between the AP MLD and the non-AP STA MLD communicate in a TXOP, and the STR/non-STR indication can identify whether the communication is in STR mode or non-STR mode.

Specifically, the first information may include at least one of: an identifier of the first link pair set (link pair set 1, link pair set 2, etc., as shown in Table 1), and a communication mode indication for the first link pair set (STR/Non-STR indication 1, STR/Non-STR indication 2, etc., as shown in Table 1); or an identifier of the second link pair set (Link pair set 1, Link pair set 2, etc., as shown in Table 1), and a communication mode indication for the second link pair set (STR/Non-STR indication 1, STR/Non-STR indication 2, etc.).

According to the embodiments, the link pair may be non-overlapping same/different bandwidth communication links at the same frequency or same/different bandwidth communication links at different frequencies, e.g., two 20 MHz bandwidth communication links at 2.4 GHz, and this link pair may be a Non-STR link. For another example, one link is a 20 MHz bandwidth communication link at 2.4 GHz, and the other link is a 160 MHz/320 MHz bandwidth communication link at 6 GHz spectrum, and this link pair may be a STR link.

In addition, the first information may further include at least one of a TXOP identifier corresponding to the first link pair set, or a TXOP identifier corresponding to the second link pair set (e.g., TXOP 1, TXOP 2, etc., as shown in Table 1).

For descriptive purposes, for example, but without limitation, the link pair set 1 shown in Table 1 may correspond to an identifier of the first link pair set. That is, the link pair identified by the link pair set 1 can simultaneously perform the uplink transmission and the downlink transmission. Therefore, the communication mode indication for the first link pair set (such as STR/Non-STR indication 1 shown in Table 1) can be set to the first specific value (such as "1"), to identify the links in the first link pair set as communicating in STR mode, and the TXOP 1 can identify the transmission time used by the links in the first link pair set. The link pair set 2 shown in Table 1 can correspond to the identifier of the second link pair set. That is, the link pair identified by the link pair set 2 cannot perform both the uplink transmission and the downlink transmission simultaneously. Therefore, the communication mode indication for the second link pair set (such as STR/Non-STR indication 2 shown in Table 1) can be set to the second specific value (such as "0"), to identify the links in second link pair set as communicating in the Non-STR mode, and the TXOP 2 can identify the transmission time used by the links in the second link pair set.

In the embodiments of the present disclosure, it will be understood that while the term "link pair" is used herein, the term "link pair" is not limited to including two links in pairs, but may include any number of links.

According to the embodiments, the first information may further include: a plurality of pieces of duration information (not shown in Table 1) in a corresponding TXOP, where the plurality of pieces of duration information corresponds to link pairs in a corresponding link pair set, respectively. For example, each TXOP may be divided into a plurality of pieces of duration information, i.e., the plurality of pieces of duration information may be identified in the TXOP, e.g., the TXOP 1 of Table 1 may include a plurality of pieces of duration information corresponding to the first link pair set, and the TXOP 2 may include a plurality of pieces of duration information corresponding to a second link pair set. To describe the TXOP 1 and the link pair set 1 as an example, for example, the TXOP 1 may include first duration information, and second duration information, and the first link pair set may include a first link pair (e.g., a part of multiple links) and a second link pair (e.g., the other part of the multiple links). The first duration information may correspond to the first link pair to identify that the first link pair occupies the time indicated by the first duration information in the TXOP 1, and the second duration information may correspond to the second link pair to identify that the second link pair occupies the time indicated by the second duration information in the TXOP 1.

According to the embodiments, when there is the second link pair set, the first information further includes an uplink and downlink transmission identifier (not shown in Table 1), which is configured to indicate a transmission mode performed by the second link pair set, and the transmission mode includes an uplink transmission mode or a downlink transmission mode. For example, when the communication mode indicator (i.e., STR/Non-STR indication 2) in Table 1 identifies the links in the link pair set (i.e., the link pair set 2) as a Non-STR mode, the first information may also include an uplink and downlink transmission identifier corresponding to the link pair set 2, which may indicate whether the links in the link pair set 2 performs an uplink transmission or performs a downlink transmission.

With continued reference to FIG. 3, at step 320, the first message frame determined in step 310 may be transmitted. For example, an access point can broadcast its communication with the station in multiple links in an action frame or beacon frame. Specifically, the AP MLD can carry the link pair used by the AP MLD in the form of an information element and identify the link pair as the STR or the Non-STR in a link. The format of the information element can be shown in Table 1. In the information elements shown in Table 1, the link pair set can identify which link in the non-AP STA MLD communicates with the AP MLD in a TXOP, and the STR/Non-STR indication can identify the link for communication as the STR or the Non-STR. If it is Non STR, it can identify the communication as UL/DL. The carried content can be known by other AP MLDs (as receivers) for communication planning.

It will be understood that the communication method shown in FIG. 3 is only exemplary and the present disclosure is not limited thereto. For example, the communication mode shown in FIG. 3 may also include: receiving relevant information for link pair sets in the multiple links from a station supporting multi-link communication (e.g., a non-AP STA MLD); and performing communication planning based on the relevant information. For example, an access point (e.g., an AP MLD) supporting multi-link communication may receive the relevant information about the link pair set from the non-AP STA MLD with which the AP MLD has established multi-link communication, and the relevant information may include the situation of communication of the link pair in multiple links supported by the non-AP STA MLD. The access point (e.g., the AP MLD) supporting multi-link communication may plan its own communications for multiple links based on the received relevant information.

Figure 4:
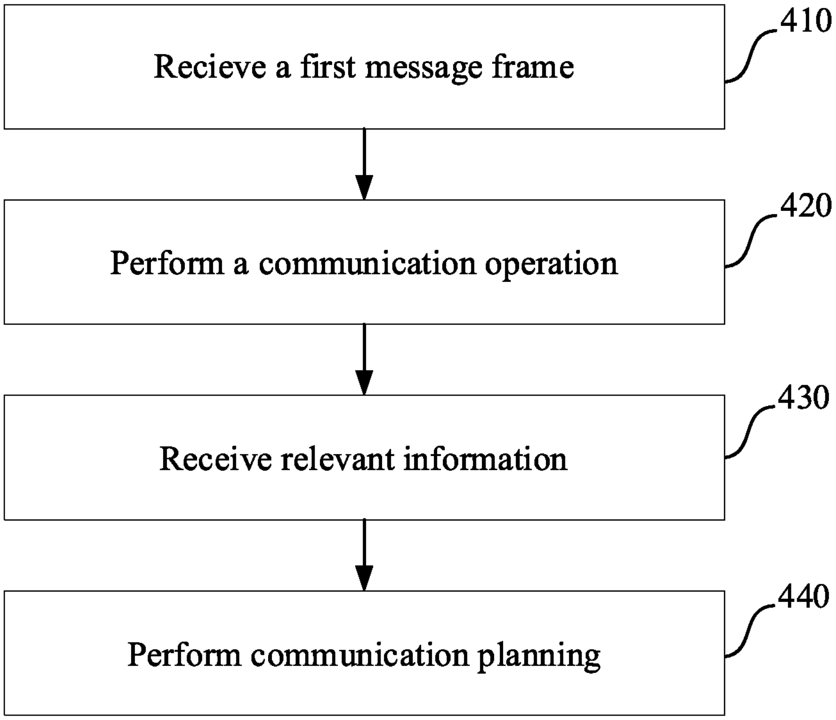
FIG. 4 is a flowchart illustrating a method for multi-link communication according to another embodiment of the present disclosure.

FIG. 4 is a flowchart illustrating a method for multi-link communication according to another embodiment of the present disclosure. The method shown in FIG. 4 may be applied in an OBSS communication environment, as shown in FIG. 2. In addition, the method shown in FIG. 4 may be applied to an access point supporting multi-link communication (e.g., an AP MLD) as a receiver.

Referring to FIG. 4, at step 410, a first message frame may be received, where the first message frame may include first information. For example, the AP MLD, as a receiver, may receive the first message frame from a device supporting multi-link communication, and the first message frame may include first information related to another access point corresponding to the device. In an embodiment, the device may be another access point, i.e., the AP MLD as a receiver may directly listen to (receive) the first message frame sent by the another access point and be informed of the first information. In another embodiment, the device may be a station and corresponds to the another access point, in this case, the AP MLD as a receiver does not listen to (receive) the first message frame sent by the another access point, but receives the first message frame from the device as a station, that is, the device as a station may receive the first message frame from the another access point and forward the received first message frame to the AP MLD as a receiver. The first information can be configured to indicate the communication mode information of the link pairs in multiple links supported by another access point corresponding to the device in each TXOP. The communication mode information of the link pairs can include at least one of: communication mode information for a first link pair set that is allowed to perform both uplink transmission and downlink transmission simultaneously, or communication mode information for a second link pair set that is not allowed to perform both uplink transmission and downlink transmission simultaneously. As an embodiment, the first message frame can be an action frame or a beacon frame. However, the present disclosure is not limited to thereto, and any other form of frame is also feasible. In addition, the first information can be carried in the form of an information element (such as a multi-link (ML) information element) in the first message frame.

According to the embodiments, the first information may include at least one of: an identifier of the first link pair set, and a communication mode indication for the first link pair set; or an identifier of the second link pair set, and a communication mode indication for the second link pair set. According to the embodiments, the first information may further include at least one of a TXOP identifier corresponding to the first link pair set or a TXOP identifier corresponding to the second link pair set. According to the embodiments, the first information may further include: a plurality of pieces of duration information in a corresponding TXOP, where the plurality of pieces of duration information corresponds to link pairs in a corresponding link pair set, respectively. According to the embodiments, when there is the second link pair set, the first information further includes an uplink and downlink transmission identifier, which is configured to indicate a transmission mode performed by the second link pair set, and the transmission mode includes an uplink transmission mode or a downlink transmission mode. That is, the first information (ML information element) may have a format shown in Table 1, and repeated descriptions are omitted herein for brevity.

At step 420, a communication operation may be performed based on the first message frame. For example, the AP MLD as a receiver may perform communication planning based on the first information about the another access point in the first message frame. For example, according to the communication situation of the first message frame broadcast by the AP MLD as a transmitter in STR mode or Non-STR mode communication, the AP MLD as a receiver can schedule communication for multiple links of the AP MLD.

At step 430, relevant information for link pair sets in the multiple links can be received from a station supporting multi-link communication. At step 440, communication planning can be performed based on the relevant information. For example, an AP MLD in the OBSS can receive information about the multi-link communication mode (STR mode or Non-STR mode) between the AP MLD and a non-AP STA MLD from the non-AP STA MLD that establishes communication with the AP MLD, and schedule communication for multiple links based on the information, or determine its own information as shown in Table 1, in order to achieve multi-AP coordination in the OBSS.

Although steps 410 to 440 are illustrated in FIG. 4 and steps 430 and 440 are performed after step 420, the present disclosure is not limited to thereto. For example, step 430 may be performed synchronously or sequentially with step 410, and step 420 can be omitted, and then in step 440, based on the first information in the received first message frame and the received relevant information, communication planning is performed.

Figure 5:
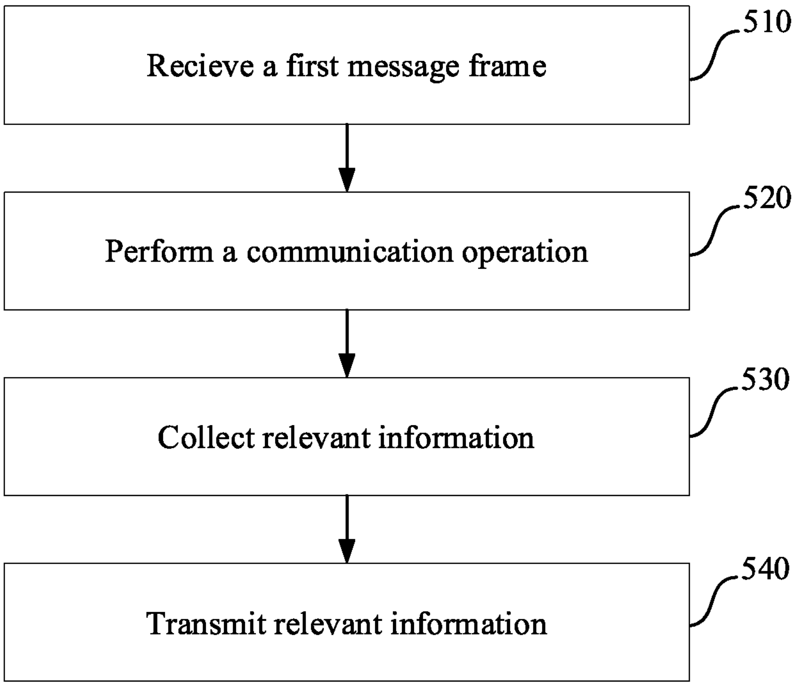
FIG. 5 is a flowchart illustrating a method for multi-link communication according to yet another embodiment of the present disclosure.

FIG. 5 is a flowchart illustrating a method for multi-link communication according to yet another embodiment of the present disclosure. The method shown in FIG. 5 may be applied in an OBSS communication environment shown in FIG. 2. In addition, the method shown in FIG. 5 may be applied to a station supporting multi-link communication as a receiver (non-AP STA MLD).

Referring to FIG. 5, at step 510, a first message frame may be received, where the first message frame may include first information. According to the embodiments, the first information may be information about an access point (AP MLD) that establishes a multi-link communication with a station (non-AP STA MLD). The first information is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously.

As an embodiment, the first message frame may be received from the AP MLD as a transmitter and may be an action frame or a beacon frame; however, the present disclosure is not limited to thereto, and any other form of frame is also feasible.

In addition, the first information may be carried in the first message frame in the form of an information element (e.g., a multi-link (ML) information element). According to the embodiments, the first information may include at least one of: an identifier of the first link pair set, and a communication mode indication for the first link pair set; or an identifier of the second link pair set, and a communication mode indication for the second link pair set. According to the embodiments, the first information may further include at least one of a TXOP identifier corresponding to the first link pair set or a TXOP identifier corresponding to the second link pair set. According to the embodiments, the first information further includes: a plurality of pieces of duration information in a corresponding TXOP, where the plurality of pieces of duration information corresponds to link pairs in a corresponding link pair set, respectively. According to the embodiments, when there is the second link pair set, the first information further includes an uplink and downlink transmission identifier, which is configured to indicate a transmission mode performed by the second link pair set, and the transmission mode includes an uplink transmission mode or a downlink transmission mode. That is, the first information (ML information element) may have a format shown in Table 1, and repeated descriptions are omitted herein for brevity.

At step 520, a communication operation may be performed based on the first message frame. For example, the non-AP STA MLD as the receiver may perform communication planning based on the first information in the first message frame received from the AP MLD as a transmitter. For example, the first information in the received first message frame identifies the first link (link 1) and the second link (link 2) as a Non-STR link pair, and the link 1 performs a downlink transmission in the TXOP. When the non-AP STA MLD transmits information to the AP MLD (uplink transmission), the second link (link 2) is not used, but the third link (link 3) is used. In this case, the link1 and link3 are a STR link pair.

At step 530, relevant information for link pair sets in the multiple links can be collected. At step 540, the relevant information is transmitted to an access point supporting multi-link communication. For example, the non-AP STA MLD may collect the connected link pairs of an AP MLD with which the non-AP STA MLD does not have multi-link communication and report the relevant information to an AP MLD with which the non-AP STA MLD has established multi-link for communication planning. Alternatively, the non-AP STA MLD may collect the situation of link pairs of an AP MLD with which the non-AP STA MLD has established multi-link communication and report the relevant situation to the AP MLD for communication planning.

Although FIG. 5 shows that steps 530 and 540 are performed after steps 510 and 520, however, the present disclosure is not limited thereto. For example, steps 530 and 540 may be performed prior to steps 510 and 520, or may be performed synchronously. In addition, some of the steps shown in FIG. 5 may be omitted.

Figure 6:
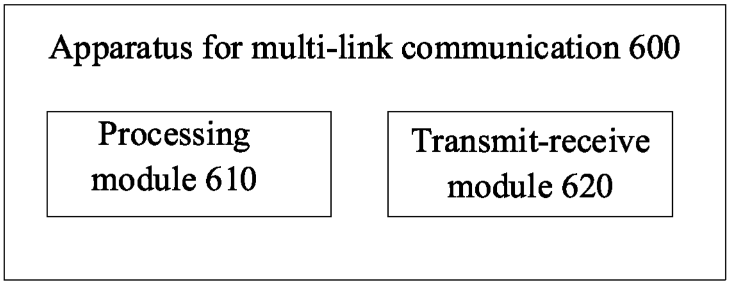
FIG. 6 is a block diagram illustrating an apparatus for multi-link communication according to an embodiment of the present disclosure.

FIG. 6 is a block diagram illustrating an apparatus for multi-link communication according to an embodiment of the present disclosure.

Referring to FIG. 6, an apparatus 600 for multi-link communication may include a processing module 610 and a transmit-receive module 620. The apparatus 600 shown in FIG. 6 may be applied to an AP MLD or a non-AP STA MLD.

In the case where the apparatus 600 shown in FIG. 6 is applied to an AP MLD as a transmitter, the processing module 610 may be configured to determine a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and the transceiver module 620 may be configured to transmit the first message frame. In this case, the apparatus 600 may perform the method described with reference to FIG. 3, and repeated descriptions are omitted herein for brevity.

In the case where the apparatus 600 shown in FIG. 6 is applied to an AP MLD as a receiver, the transmit-receive module 620 may be configured to receive a first message frame from a device supporting multi-link communication, where the first message frame includes first information, which is configured to indicate communication mode information for link pairs in multiple links supported by another access point corresponding to the device in each transmission opportunity (TXOP), and the communication mode information for the link pairs includes at least one of: communication mode relevant information for a first link pair set that is allowed to perform both uplink transmission and downlink transmission simultaneously, or communication mode relevant information for a second link pair set that is not allowed to perform both uplink transmission and downlink transmission simultaneously; and the processing module 610 may be configured to perform a communication operation based on the first message frame. In an embodiment, the device may be another access point, i.e., the AP MLD as a receiver may directly listen to (receive) the first message frame sent by the another access point and be informed of the first information. In another embodiment, the device may be a station and communicate with the another access point. In this case, the AP MLD as a receiver does not listen to (receive) the first message frame sent by the another access point, but receives the first message frame from the device as a station. In this case, the apparatus 600 may perform the method described with reference to FIG. 4, and repeated descriptions are omitted herein for brevity.

In the case where the apparatus 600 shown in FIG. 6 is applied to a non-AP STA MLD as a receiver, the transmit-receive module 620 may be configured to receive a first message frame, where the first message frame includes first information, which is configured to indicate communication mode information for link pairs in multiple links in each transmission opportunity (TXOP), and the communication mode information for the link pairs includes at least one of: communication mode information for a first link pair set that is allowed to perform both uplink transmission and downlink transmission simultaneously, or communication mode information for a second link pair set that is not allowed to perform both uplink transmission and downlink transmission simultaneously; and the processing module 610 may be configured to control the transmit-receive module to perform a communication operation based on the first message frame. In this case, the apparatus 600 may perform the method described with reference to FIG. 5, and repeated descriptions are omitted herein for brevity.

Furthermore, the apparatus 600 shown in FIG. 6 is only exemplary, and the embodiments of the present disclosure are not limited thereto, e.g., the apparatus 600 may also include other modules, e.g., a memory module and the like. In addition, various modules in the apparatus 600 may be combined into more complex modules or may be divided into more separate modules.

The methods and apparatuses for multi-link communication based on the embodiments of the present disclosure enable STR and Non-STR information to be used in multi-AP coordination in multiple links, thus system throughput is improved.

Based on the same principles as the methods provided in the embodiments of the present disclosure, the embodiments of the present disclosure also provide an electronic device including a processor and storing instructions (which may also be referred to as computer programs) executable by the processor, where the processor is configured to, when executing the instructions, perform the method described with reference to FIGS. 3 to 5.

The embodiments of the present disclosure also provide a computer-readable storage medium, storing computer programs thereon, where the computer programs, when executed by a processor, cause the processor to perform the method described with reference to FIGS. 3 to 5.

In exemplary embodiments, the processor may be a logic box, module, and circuit for implementing or executing content described in conjunction with the present disclosure, such as a central processing unit (CPU), a general purpose processor, a digital signal processor (DSP), application specific integrated Circuit (ASIC), field programmable gate array (FPGA), or other programmable logic devices, transistor logic devices, hardware components, or any combination thereof. A processor may also be a combination that implements a computing function, such as a combination containing one or more microprocessors, a combination of a DSP and a microprocessor, and the like.

In exemplary embodiments, the memory may be, for example, a read only memory (ROM), a random access memory (RAM), an electrically erasable programmable read only memory (EEPROM), a compact disc read only memory (CD-ROM) or other optical disk storage, an optical disk storage (including a compact disc, a laserdisc, a CD-ROM, a digital versatile disc, a Blu-Ray disc, etc.), a disk storage media or other magnetic storage devices, or any other medium that can be used to carry or store program code in the form of instructions or data structures and can be accessed by a computer, but is not limited to thereto.

It will be understood that although the steps in the flowchart of the accompanying drawings are shown sequentially as indicated by the arrows, the steps are not necessarily executed sequentially in the order indicated by the arrows. Unless expressly stated herein, there is no strict order limitation on the execution of these steps, which may be executed in some other order. In addition, at least some of the steps in the flowchart of the accompanying drawings may include a plurality of sub-steps or a plurality of phases, which are not necessarily executed to completion at the same moment but may be executed at different moments, and which may be executed in an order that is not necessarily sequential, but may be executed in turn or alternately with at least a portion of the other steps, or of the sub-steps or phases of the other steps.

While the present disclosure has been shown and described with reference to certain embodiments of the present disclosure, those skilled in the art will appreciate that various changes in form and detail may be made without departing from the scope of the present disclosure. Accordingly, the scope of the present disclosure should not be limited to the embodiments, but should be limited by the accompanying claims and their equivalents.

The invention claimed is:

1. A method for multi-link communication, applied to a communication system comprising a first access point supporting multi-link communication, a second access point supporting multi-link communication and a station supporting multi-link communication, and comprising:

receiving, by the second access point supporting multi-link communication, a first message frame from the first access point supporting multi-link communication or the station supporting multi-link communication, wherein the first message frame comprises first information, which is configured to indicate communication mode information for link pairs in multiple links supported by another access point corresponding to a device in each transmission opportunity (TXOP), and the communication mode information for the link pairs comprises at least one of: communication mode relevant information for a first link pair set that is allowed to perform both uplink transmission and downlink transmission simultaneously, or communication mode relevant information for a second link pair set that is not allowed to perform both uplink transmission and downlink transmission simultaneously; and performing, by the second access point supporting multi-link communication, a communication operation based on the first message frame;

wherein the first link pair set and the second link pair set are link pairs used by the first access point supporting multi-link communication; and wherein the first access point supporting multi-link communication and the second access point supporting multi-link communication are both in communication with the station supporting multi-link communication.

2. The method of claim 1, wherein the first information comprises at least one of:

an identifier of the first link pair set, and a communication mode indication for the first link pair set; or an identifier of the second link pair set, and a communication mode indication for the second link pair set.

3. The method of claim 2, wherein the first information further comprises at least one of a TXOP identifier corresponding to the first link pair set, or a TXOP identifier corresponding to the second link pair set.

4. The method of claim 3, wherein the first information further comprises: a plurality of pieces of duration information in a corresponding TXOP, wherein the plurality of pieces of duration information corresponds to link pairs in a corresponding link pair set, respectively.

5. The method of claim 1, wherein when there is the second link pair set, the first information further comprises an uplink and downlink transmission identifier, which is configured to indicate a transmission mode performed by the second link pair set, and the transmission mode comprises an uplink transmission mode or a downlink transmission mode.

6. The method of claim 1, further comprises:

receiving relevant information for link pair sets in the multiple links from a station supporting multi-link communication; and performing communication planning based on the relevant information.

7. An electronic device, comprising:

a processor; and a memory storing computer programs executable by the processor, wherein the processor is configured to, when executing the computer programs, perform the method of claim 1.

* * * * *